United States Patent [19]
Waldron

[11] 4,014,706
[45] Mar. 29, 1977

[54] SOLID SOLUTION CERAMIC MATERIALS

[75] Inventor: Robert D. Waldron, Scottsdale, Ariz.

[73] Assignee: Research Enterprises Corporation, Phoenix, Ariz.

[22] Filed: Apr. 21, 1975

[21] Appl. No.: 569,834

Related U.S. Application Data

[63] Continuation of Ser. No. 252,659, May 12, 1972, abandoned.

[52] U.S. Cl. .................................. 106/55; 106/57; 106/63; 106/73.1; 106/73.2

[51] Int. Cl.$^2$ ................. C04B 35/00; C04B 35/48; C04B 35/50

[58] Field of Search ............... 106/55, 57, 63, 73.1, 106/73.2

[56] References Cited

UNITED STATES PATENTS 3,341,437   9/1967   Wood .................................. 106/55

*Primary Examiner*—J. Poer
*Attorney, Agent, or Firm*—Charles E. Cates

[57] ABSTRACT

New compositions of matter each consisting essentially of a solid solution of compounds and a halide binder aid. The novel compositions have melting points above 1800° C, high mechanical integrity, low thermal conductivity, and are essentially non-reactive with molten reactive and refractory metals. The novel compositions sinter at 1000° to 1300° C.

19 Claims, No Drawings

SOLID SOLUTION CERAMIC MATERIALS

This is a continuation of application Ser. No. 252,659, filed May 12, 1972, now abandoned.

FIELD OF THE INVENTION

This invention relates to materials and compositions useful for making ceramic articles for general refractory applications and especially for containingg molten reactive and refractory metals such as beryllium, columbium (niobium), hafnium, molybdenum, tantalum, titanium, uranium, zirconium and such alloys as contain substantial fractions of said metal(s).

DEFINITIONS

A solid solutions as used herein means a homogeneous (single phase) blend or combination of two or more substantially stoichiometric compounds which may have similar or different crystallographic structures. A solid solution, so defined, exists over a partial or complete range of proportions or ratios of the constituent compounds and is contiguous to at least one of the components which may be considered to be the "solvent" phase. Such solid solutions will have a single crystallographic structure and the lattice dimensions of said structure and all physical and chemical properties of the solution are continuous functions of composition. The lattice symmetry may change within said composition range by uniform distortion of the structure as the composition changes.

Rare earth-like (metallic) elements as used herein means elements of atomic numbers 21, 39, and/or 57–71.

Yttrium earth (metallic) elements as used herein means elements of atomic numbers 39 and/or 64–71.

Complex halide as used herein means a compound of two or more metallic elements with halogens; e.g. Na-$LaF_4$.

DESCRIPTION OF THE PRIOR ART

The vast majority of applications for engineering materials involve use at ambient service temperatures, but the field of specialty materials required for high temperature or refractory service serves an absolutely essential role in our present day technology. In particular, the refractories designed for handling molten metals must not only be capable of withstanding the melting temperatures required, but must also resist chemical attack or corrosion under the operating conditions present. This combination of high melting point and low chemical reactivity has never been satisfactorily solved for applications involving handling of the reactive and refractory metals such as titanium, columbium, zirconium, etc. by either metallic or non-metallic (ceramic) materials. While the metals have good mechanical properties they invariably tend to dissolve and erode in contact with the molten reactive metals, while all prior non-metallic refractories tend to react with and contaminate molten reactive metals. This problem has been so severe, that the reactive metals industry has almost universally adopted "skull" melting apparatus for melting, alloying or casting ingots of these products. This involves melting the metal using an electric arc or other top heating method in a liquid cooled metal container (usually copper) wherein enough heat is withdrawn from the container to freeze a layer of the reactive metal at the container wall which then serves to contain the molten pool without contamination. A second approach which has been disclosed in U.S. Pat. Nos. 3,417,808 and 3,493,363 involves the use of a molten film of low reactive or non-reactive materials (usually halides) as a barrier layer between the molten reactive metal and a conventional refractory container, but these methods have not found widespread utility. For casting reactive metals parts where the duration of exposure to molten metal is brief and the exposure temperature drops steadily, a number of metallic and non-metallic systems have been developed and tried, but all of them have their peculiar disadvantages which has made the casting of these metals extremely difficult. The best prior art systems in current use for titanium casting involve tungsten or graphite interface materials. By casting into molds with little or no preheat, the degree of contamination can be limited due to rapid freeze-up, but this often results in surface or internal defects due to premature freezing such as cold laps, misruns, shrinkage and difficulties in completely filling the mold cavity, especially in thin sections.

Thus there has existed a long recognized need for a refractory material or composition that is less reactive than heretofore known to the art.

Although it is known to the art that certain halides are substantially inert to molten reactive and refractory metals, the melting points of such halides are substantially below the melting points of most such metals. Solid solutions of fluorides in oxyfluorides were also known to prior investigators in the structural chemistry field. These solutions had not been characterized in regard to melting points, thermal conductivities or reactivity toward molten reactive or refractory metals and were not employed in the ceramic or casting arts. As a result of a screening program for possible materials of potential use for the purposes outlined above, the properties enumerated above were determined for several representative solid solutions and it was determined for several representative solid solutions and it was established that they have a superior combination of refractory character and low reactivity toward reactive metals than any previously reported materials. Such solid solutions of fluorides in oxyfluoride have several disadvantages however that limit their usefulness: (a) they require very high sintering temperatures to develop useful strengths (near 1800° C); (b) they are subject to loss of fluoride content on continued exposure to very high temperatures due to disproportionation and volatization, or hydrolysis in contact with water vapor.

BRIEF SUMMARY OF THE INVENTION

I have discovered, however, that by adding small amounts of certain halides to the previous solid solutions, that most of the previous deficiencies can be eliminated or greatly reduced. A minimum of at least 0.1 mole percent compounds selected from the group consisting of alkaline earth halides, yttrium earth halides and complex halides is added to serve as a binder aid. These added halides: (1) are incorporated into the previous solid solutions, (2) do not appreciably alter or reduce the melting points of the solid solutions, (3) permit the modified solid solutions to be sintered to useful strengths at temperatures in the range of 1000° to 1300° C, (4) do not appreciably increase the reactivity of the original solid solutions toward molten reactive or refractory metals, and (5) greatly reduce the tendency toward loss of fluoride content on processing by allowing formation and fabrication to proceed at lower temperatures.

I have also discovered a second class of solid solution which is different from the fluoride in the oxyfluoride group. This class consists essentially of mixtures of tetravalent transition metal dioxides with rare earth oxyfluorides or alkaline earth fluorides with oxygen: fluorine ratios of 1:1 or higher. These mixtures when heated form solid solutions which possess the following properties: (a) melting points are generally above 2200° C, (b) vapor pressures as measured by weight losses are lower than for other solid solutions of lower O:F ratio, (c) reactivities toward molten reactive and refractory metals are lower than any pure oxide ceramics and approach that of the oxyfluoride-fluoride solid solutions. These solid solutions suffer from some of the same disadvantages previously mentioned for the fluoride-oxyfluoride systems, namely: high temperature requirement for sintering (1800° C), potential loss of fluorine during high temperature processing, and marginal strength.

By incorporating added halides, however, these solid solutions can also be sintered at temperatures in the range of 1000° to 1300° C with improved strengths and less risk of composition change. A minimum of at least 0.1 mole percent compounds selected from the group consisting of alkaline earth halides, yttrium earth halides and complex halides is added to serve as a binder aid.

There is a considerable latitude of choice in compositions within the general scope of these solid solutions and the preferred embodiments depend somewhat on the end use according to the relative importance of such properties as chemical reactivity, high temperature strength, vapor pressure, compositional stability, melting point, etc. For example, for applications involving the higher melting reactive and refractory metals such as columbium, a very high melting point become important, while for disposable molds for titanium, a low reactivity or low cost material may be preferred.

In one class of preferred embodiments for very high temperatures service, the solid solutions consist essentially of transition metal dioxides (from the group consisting of $CeO_2$, $HfO_2$, $ThO_2$, and/or $ZrO_2$) combined with rare earth oxyfluorides or alkaline earth fluorides. The preferred atomic ratio of O/F would lie in the range of 2:1 to 5:1. A typical example would consist of 1 mole (GFW) $HfO_2$ with 1 mole of YOF plus 0.05 to 0.2 moles of $YF_3$.

In a second class of preferred embodiments for lower temperature service but with minimum reactivity toward molten reactive metals, the solid solutions are composed substantially of rare earth oxyfluoride combined with rare earth or alkaline earth fluorides plus an added binder consisting of an alkaline earth, yttrium earth or complex halide, preferably fluoride. The preferred atomic ratio of O/F lies in the range of 0.5:1 to 1:1. A typical example would consist of 12 moles (gram formula weights) of LaOF to 1 mole of $LaF_3$ plus ¼ to ½ mole of $BaF_2$. The $BaF_2$ could also be replaced by comparable amounts of $SrF_2$, $YF_3$, $NaLaF_4$, etc.

The solid solutions may also be derived from reciprocal systems in which some portions or all of the original components are replaced by tetravalent fluorides and/or oxyfluorides and trivalent oxides and/or oxyfluorides and optionally the corresponding oxides or oxyhalides of the added halide(s). For certain ratios of starting compounds, it is possible to obtain the same final chemical composition of solid solution from reciprocal systems as from the original system following exposure to high temperatures. For example, a solid solution derived from $3ThO_2 + 4LaF_3$ is identical to one derived from $3ThF_4 + 2La_2O_3$. However, if one departs from the ratios of starting materials as indicated for either system, there exists a range of solid solutions whose composition cannot be obtained from either starting set alone but whose chemical and physical properties are useful in the applications of this invention.

It is possible that some of the compositions may also exist initially at room temperature in two or more crystal phases (rather than a solid solution) which are subsequently transformed to a solid solution at the temperatures employed in casting refractory metals. The important consideration is that the mechanical integrity is maintained at high temperature service, implying a persisting solid solution.

The melting points of solid solutions of the aforementioned components are substantially elevated from that of the lowest melting constituent even for oxygen-fluorine ratios well below unity. Moreover, the vapor pressure of the fluorides in equilibrium with these solid solutions is substantially lower than for the pure fluorides at equivalent temperatures. The rates of reaction with moltenn titanium and other reactive and refractory metals are extremely low, approaching the pure fluorides in respect to this quality. In addition they exhibit low thermal conductivity and sinter at temperatures between 1000° to 1300° C. with superior mechanical integrity.

ADVANTAGES

A number of distinct advantages flow from the novel compositions surprising properties.

The mechanical integrity of the compositions make possible a stronger vessel using less material than required by prior art materials.

Whereas the prior art solid solutions without added binder halides must be sintered at very high temperatures (on the order of 1800° C), the compositions of this invention sinter at 1000° to 1300° C, and the latter compositions are stronger mechanically than the higher-sintering prior art compositions. Another advantage of this property is that valuable fluorides can be retained in the compositions of this invention. Furthermore, less expensive equipment can be utilized while increasing the capability for maintaining dimensional control of the ceramic ware end product.

The surprisingly high melting points of the new compositions suit them as containers for molten refractory metals whose melting points are higher than prior art fluoride based fluxing systems. Fortuitously, the compositions are essentially non-reactive towards molten refractory metals and lend themselves ideally to use as mold materials for casting such metals.

DETAILED DESCRIPTION OF THE PREFERRED EMBODIMENTS

In the selection of compounds from which to prepare preferred solid solutions for particular service according to the teachings of this invention, chemists or ceramicists will be guided by certain principles well known to those skilled in the art—among these the sizes and coordination numbers of ionic constituents, electrical charge balance and energy, and thermochemical stability. Such considerations will influence the selection (out of the alternatives offered by the invention) of various compounds having tendencies toward mutual solubilities in the solid state. Other desired properties such as low cost, low toxicity, ease of handling, etc. will also influence choice of constituent compounds. Representative examples follow.

The properties of both refractory nature (high melting point) and chemical inertness (low reactivity) are favored by selection of compounds with high negative heats or free energies of formation. For oxides, these occur for compounds with alkaline earth, rare earth and quadrivalent transition metals, while for fluorides, the most stable compounds are formed with the alkaline earth and rare earth group metals.

To achieve a solid solution from given starting materials, it is generally necessary to provide a ratio of cations to anions compatible with the ratio of cation to anion sites characteristic of the crystal lattice structure desired — some latitude is available where lattice vacancies or interstitial ions can exist in a particular structure however. For structures isomorphous with rare earth oxyfluorides or transition metal dioxides, the theoretical ratio of cations to anions is 1:2.

The atomic ratios of oxygen to fluorine generally affects both the melting point and chemical reactivity of a given solid solution system. For highest service temperature requirements, it is generally necessary to employ solid solutions of transition metal dioxides with either rare earth oxyfluorides or alkaline earth fluorides. (I have found that the transition metal dioxides with highest melting points, specifically $CeO_2$, $HfO_2$, $ThO_2$, and $ZrO_2$ give the best results in such cases. $CeO_2$, while less expensive, is more easily reduced at high temperatures than the other three and should be combined with appreciable amounts of one or more of the other oxides to lower its reactivity.) An O/F ratio in the range of 6:1 to 1:1 is preferable. At the high end of the range, the reactivity toward molten reactive metals will degrade and approach that of the pure oxides, while at the lower limit one approaches a pure travalent oxyfluoride in oxide-oxyfluoride solid solutions, and for oxide-fluoride solid solutions the melting points drop excessively. These low O/F ratio solid solutions still have useful properties for lower temperature service however, the most favorable range of O/F ratios lies between 4:1 and 1.5:1.

To provide solid solutions with minimum chemical reactivity toward molten reactive metals, I have found that solid solutions with lower O/F ratios in the range of 1:1 to 0.5:1 are preferable. The highest melting points and lowest reaction rates are obtained with solid solutions of rare earth oxyfluorides with rare earth or alkaline earth fluorides. Among the rare earth group, the highest melting points and best properties are found for the lighter rare earth compounds; namely, those consisting predominantly of lanthanum, cerium, neodymium, and yttrium. The first three are also among the most abundant and thus least expensive of the rare earth elements. (Calcium fluoride is by far the least expensive fluoride suitable for such solid solutions, but if employed in too large an amount will detract from the low reactivity of a given system. If one approaches the lower limits of O/F ratio (0.6:1 to 0.5:1) not only does one obtain solid solutions with depressed melting points, but the vapor pressures in equilibrium with such systems increase at a given service temperature, and one may reach the limits of solubility for cases where the fluoride constituent is predominantly a rare earth fluoride. The most favorable properties are generally obtained for O/F ratios in the range of 1:1 to 0.75:1 for solid solutions of rare earth oxyfluorides with rare earth or alkaline earth fluorides.

The factors of importance for selection of a binder are generally less critical than for the primary solid solution constituents, but it is imperative that the solid solution be capable of accommodating the binder within the single phase system in the amounts used and that the binder facilitate the diffusion and grain growth required to sinter the solid solution at the desired temperature. It should also not cause a significant increase in chemical reactivity toward molten reactive metals. Halides with small, diffusable ions of high thermochemical stability have proven most satisfactory with fluorides of the alkaline earth, yttrium earth or complex group giving the best results.

EXAMPLES

The compositions of matter disclosed by this invention were prepared in a form suitable for testing of properties (including crystal structure, melting point, reactivity toward molten reactive and refractory metals and general mechanical properties) as follows: (1) mixtures of weighed quantities of finely divided metal oxides and fluorides corresponding to the desired final compositions were blended by mechanical agitation; (2) a shallow layer of the blended power was dry-pressed into folded box trays made of tantalum foil; (3) these trays containing a known weight of premixed ingredients were inserted into a folded Z strip tantalum heater with radiation shields in a zone subject to substantially uniform heating; (4) the apparatus was evacuated and partially back-filled with argon to a pressure of about one pound per square inch (absolute) and the sample was heated by passing an electric current through the strip heater to raise the sample temperature to above 1800° C; 5) the temperature was held for about thirty seconds; 6) the sample was then cooled and removed for inspection. Table I shows the composition resulting from the various starting materials.

TABLE I

| | | | Composition Tests | | | | |
|---|---|---|---|---|---|---|---|
| | Designation | Solid Solution Type | X-ray Symmetry | Components | Starting Materials | Strength | O/F Ratio |
| 1. | TYOF1 | O/OF | | $ThO_2$, YOF | $ThO_2$, $Y_2O_3$, $YF_3$ | 3 | 3 |
| 2. | HOF1A | O/OF | C | $HfO_2$, YOF | $HfO_2$, $Y_2O_3$, $YF_3$ | | 3 |
| 3. | TOF2A | O/F | C | $ThO_2$, $LaF_3$ | $ThO_2$, $LaF_3$ | | 2 |
| 4. | LOF1C | OF/F | T | $LaOF$, $LaF_3$ | $La_2O_3$, $LaF_3$ | 4 | .9 |
| 5. | LOF1C' | OF/F | H | $LaOF$, $LaF_3$, $BaF_2$ | $La_2O_3$, $LaF_3$, $BaF_2$ | 3 | .87 |
| 6. | LOF1D' | OF/F | T | $LaOF$, $LaF_3$, $BaF_2$ | $La_2O_3$, $LaF_3$, $BaF_2$ | 2 | .77 |
| 7. | LOF5A | OF/F | T | $LaOF$, $LaF_3$, $MgF_2$ | $La_2O_3$, $LaF_3$, $MgF_2$ | 3 | .87 |
| 8. | YOF2A | OF/F | | $YOF$, $LaOF$, $LaF_3$ | $Y_2O_3$, $LaF_3$ | | .99 |
| 9. | DOF2B | OF/F | | *DiOF, $DiF_3$ | $Di_2O_3$, $DiF_3$ | | .9 |
| 10. | DOF2C' | OF/F | C | $DiOF$, $DiF_3$, $CaF_2$ | $Di_2O_3$, $DiF_3$, $CaF_2$ | | .81 |
| 11. | NOF1A | O/F | H | $Nd_2O_3$, NdOF, DiOF, $SrF_2$ | $Nd_2O_3$, $DiF_3$, $SrF_2$ | 1 | 1.49 |

TABLE I-continued

| Designation | Solid Solution Type | X-ray Symmetry | Composition Tests Components | Starting Materials | Strength | O/F Ratio |
|---|---|---|---|---|---|---|
| 12. YOF2B | OF/F | | YOF,LaOF,LaF$_3$ | Y$_2$O$_3$,LaF$_3$ | 4 | .8 |
| 13. LOF1F | OF/F | C | LaOF,LaF$_3$,SrF$_2$ | La$_2$O$_3$,LaF$_3$,SrF$_2$ | | .67 |
| 14. LOF1N | OF/F | T | LaOF,LaF$_3$,NaLaF$_4$ | La$_2$O$_3$,LaF$_3$,NaLaF$_4$ | 2 | .8 |
| 15. YOF6A | OF/F | | YOF,YF$_3$ | Y$_2$O$_3$,YF$_3$ | 4 | .85 |
| 16. TOMF1D | O/F | | ThO$_2$, CaF$_2$,SrF$_2$ | ThO$_2$, CaF$_2$,SrF$_2$ | 2 | 3 |

1. C = cubic, H = hexagonal, T = tetragonal
2. 1 = very strong, 2 = strong, 3 = medium, 4 = weak, 5 = very weak
*Di Didymium, a commercial designation for rare earths after removal of most of cerium content. The approximate composition of didymium oxide is: La$_2$O$_3$ 40–45%, CeO$_2$ 1–2%, Pr$_6$O$_{11}$ 8–12%, Nd$_2$O$_3$ 32–37%, Sm$_2$O$_3$ 3–6%, Gd$_2$O$_3$ 2–4%, Y$_2$O$_3$ 2–1% other REO 1–2%

Many of the original screening tests of this nature were made with compositions without the added halide referred to in the compositions of this invention. The very high firing temperatures (1800° C) employed in the above tests were required by all of the systems to sinter satisfactorily without an added halide as a ternary binder. Compositions which performed satisfactorily without added halide were generally repeated with samples containing added halide. Surprisingly, and contrary to the original samples, the latter compositions would sinter satisfactorily at temperatures of 1000° to 1300° C and could be fired in either argon or in air. These new samples were then subjected to the same types of tests as the original samples, with comparable results.

The significance of this property is that prior art solid solutions which do not have ternary binder material require prolonged exposure to very high temperatures to promote sufficient sintering to develop useful strengths in ceramic ware. In so doing, two disadvantages are encountered:

1. the solid solution tends to disproportionate (the fluoride evaporates and is lost) according to the equation $$3 MOF = M_2O_3 + MF_3\uparrow \qquad (1)$$

2. prolonged exposure to elevated temperatures leads to loss of fluorine content due to hydrolysis caused by moisture in the atmosphere according to the equation $$2MOF + H_2O = M_2O_3 + 2HF \qquad (2)$$

The addition of a ternary binder effectively eliminates (1) and reduces (2) above.

CHARACTERIZATION TESTING OF SAMPLE COMPOSITIONS

Samples prepared according to the above methods were tested for at least four important properties: melting point, crystal structure, reactive metal compatibility, and sinterability or mechanical strength.

Melting point tests were mainly of a screening nature and consisted of microscopic examination of the ceramic briquettes formed from the dry-pressed samples after firing to detect incipient or gross melting. Similar testing on other compositions known to or suspected of forming eutectic systems rather than solid solutions invariably resulted in melting for fluoride containing systems exposed to temperatures above 1800° C. (The melting points of all elemental fluorides except scandium fluoride lie below 1500° C, with the latter listed at 1515° C.) Independent testing confirms that the melting points of some solid solutions of trivalent oxyfluorides with small additions of added fluoride binders lie in the range of 2000 to 2300° C. None of the compositions listed in Table One melts below 1800° C. Table II shows the results of the melting point tests.

TABLE II

| Melting Point Tests | |
|---|---|
| Sample No. (Table I) | Melting Point |
| 2 | > 2250 |
| 6 | 2050 ± 50 |
| 10 | 1970 ± 50 |
| 14 | 2040 ± 50 |
| 15 | 2160 ± 50 |
| 16 | > 2300 |

The crystal structures of the prepared samples were determined by X-ray diffraction of the powdered samples. The presence of a single set of lines which can be indexed from a single lattice structure gives evidence of a solid solution for compositions which do not correspond to any stoichiometric ratio of components. Table I lists the crystal symmetries of the solid solutions corresponding to the compositions tested.

The crystal structure of refractory compositions may be determined by X-ray diffraction methods well known to those skilled in the art. It has been established by previous workers that the rare earth oxyfluorides crystallize in rhombohedral, tetragonal or cubic lattice structures which are, in the first two cases, derivable from the cubic (fluorite) structure by slight distortions of the lattice and atomic positions. A high pressure orthorhombic structure has also been reported. The crystal structure of ZrO$_2$ may assume either a monoclinic, tetragonal or cubic symmetry depending on temperature range and/or presence of other compounds in solid solution. CeO$_2$ crystallizes in the cubic (fluorite) structure.

X-ray investigation have confirmed these structures for the solid solutions studied.

The degree of reactivity toward molten metals was established by placing a small piece of reactive metal sheet on top of the ceramic sample and reinserting it into the strip heater used in the sample preparation. Unalloyed titanium, alloyed titanium, zirconium, columbium and beryllium were used. After repeating the evacuation and back-fill cycles described above, the sample was reheated to temperatures above the melting point of the metal sample at which time the sample chip formed a molten drop. This was held at a fixed temperature for a period of time, usually 20 seconds, after which the sample was allowed to cool. Upon removal from the apparatus the frozen droplet was mounted in a metallurgical specimen mount, sectioned and polished or etched for microscopic examination and/or microhardness measurements. Evidence of contamination in reactive metals such as titanium is more easily and readily detectable by changes in microhardness than by any other single test including chemical analysis. Results of these tests are shown in Table III. One would expect the reactivity of solid solutions containing at least 25% polyvalent metal oxide to be less than, but comparable with the reactivity of the corresponding pure oxide. However, I have discovered that reaction rates with molten reactive metals are generally reduced by factors of 20 to 100 or more.

TABLE III

Liquid Metal Compatibility Tests
Titanium Drop Microhardness (Knoop 500 g)

| Sample No. (Table I) | Surface Average (0 to .012 in.) | Interior |
|---|---|---|
| 3. | 350.5 | 316.2 |
| 4. | 303.6 | 285 |
| 5. | 322.6 | 320.4 |
| 7. | 375.8 | 365.6 |
| 8. | 300 | 256.6 |
| 9. | 314.1 | 248.2 |
| 10. | 346.3 | 329.2 |
| 12. | 304 | 271.3 |
| 13. | 406 | 255.1 |
| 14. | 321.5 | 290.5 |
| 99% Ti (no mold) | | 267(100g) |
| Grahite | 846(100g) | 593(100g) |
| Graphite (flash heat) | 406.9 | |
| $Al_2O_3$ | | 1580 |
| $Al_2O_3$ (flash heat) | | 616.9 |
| BeO | 567.5 | |
| $La_2O_3$ | 569.2(100g) 486 | |

Most testing of sinterability and mechanical strength were initially of a qualitative nature and consisted of fracture strength of original dry-pressed briquettes when exposed to pressure from a knife edge or other sharp instrument.

A comparative strength rating was established on a scale of 1 to 5 where 1 indicates a very strong product, 2 strong, 3 medium, 4 weak and 5 very weak. These ratings are shown in Table I.

The compositions of this invention can be made in commercial quantities according to the following examples:

EXAMPLE I

The solid solution described as the second example under preferred embodiments may be prepared in 1 to 50 lb. lots as follows:

1. Dry chemicals of minus 100 mesh or finer are weighed and mixed in quantities corresponding to the following ratios: $La_2O_3$— 4 moles, $LaF_3$— 5 moles, $BaF_2$— ¼ to ½ mole.
2. The mixed powder is loaded into ceramic crucibles of MgO, $ZrO_2$ or SiC, covered and inserted in electric furnaces which are brought up to 1250° C for periods of 4 to 6 hours.
3. After slow cooling in the furnace, the crucibles are removed and the sintered ingots unloaded and crushed and sized to yield desired particle size.

EXAMPLE II

A solid solution corresponding to the following composition: 30 moles DiOF; 1 mole $DiF_3$; and 3.7 moles $CaF_2$, may be prepared in 1 to 50 lb. lots as follows:

1. Dry chemicals of minus 100 mesh or finer are weighed and mixed in quantities corresponding to the following ratios: $Di_2O_3$—10 moles, $DiF_3$—11 moles, $CaF_2$—3.7 moles.
2. The mixed powder is loaded into ceramic crucibles of MgO, $ZrO_2$ or SiC, covered and inserted in electric furnaces which are brought up to 1250° C for periods of 4 to 6 hours.
3. After slow cooling in the furnace, the crucibles are removed and the sintered ingots unloaded and crushed and sized to yield desired particle size.

The solid solutions in the examples above were prepared at atmospheric pressures.

Although only representative examples of the embodiments of this invention are disclosed herein, it will occur to those skilled in the art that numerous departures, variations and modifications can be made therefrom without departing from the essential teachings of this disclosure and which are within the scope and spirit of the invention.

What is claimed is:

1. A composition of matter consisting essentially of a solid solution of
   a. a plurality of compounds, each containing one or more metallic elements, at least one of which elements is polyvalent, in combination with one or more elements selected from the group consisting of oxygen and fluorine,
   b. at least 0.1 mole percent compounds selected from the group consisting of alkaline earth halides, yttrium earth halides and complex halides, as a binder aid; said solid solution containing oxygen and fluorine in an atomic ratio of about 0.5:1 to about 5:1.

2. The composition of claim 1 having a crystal structure isomorphous with a rare earth oxyfluoride.

3. The composition of claim 1 having a crystal structure isomorphous with a tetravalent metal dioxide selected from the group consisting of zirconium oxide and cerium oxide.

4. The composition of claim 1 wherein the polyvalent metallic elements consist essentially of rare earth elements having atomic numbers 21, 39, 57 through 71 and tetravalent elements selected from the group consisting of zirconium, cerium, hafnium and thorium.

5. The composition of claim 2 wherein the polyvalent metallic elements consist essentially of rare earth elements having atomic numbers 21, 39, 57 through 71 and tetravalent elements selected from the group consisting of zirconium, cerium, hafnium and thorium.

6. The composition of claim 3 wherein the atomic ratio of oxygen to fluorine lies in the range of 5:1 to 1:1 and the polyvalent metallic elements consist essentially of trivalent rare earth elements selected from the group having atomic numbers 21, 39, 57 through 71 and tetravalent elements selected from the group consisting of zirconium, cerium, hafnium and thorium.

7. The composition of claim 4 wherein the rare earth elements are selected from the group consisting of lanthanum, cerium, neodymium and yttrium.

8. The composition of claim 5 wherein the rare earth elements are selected from the group consisting of lanthanum, cerium, neodymium and yttrium.

9. The composition of claim 6 wherein the trivalent rare earth elements are selected from the group consisting of lanthanum, cerium, neodymium and yttrium.

10. The composition of claim 1 wherein the atomic ratio of oxygen to fluorine lies in the range of about 0.5:1 to 1:1.

11. The composition of claim 1 wherein said binder aid halide compounds are fluorides.

12. The composition of claim 2 wherein said binder aid halide compounds are fluorides.

13. The composition of claim 3 wherein said binder aid halide compounds are fluorides.

14. The composition of claim 4 wherein said binder aid halide compounds are fluorides.

15. The composition of claim 5 wherein said binder aid halide compounds are fluorides.

16. The composition of claim 6 wherein said binder aid halide compounds are fluorides.

17. The composition of claim 2 wherein said polyvalent metallic element is selected from the group consisting of La and Ce.

18. The composition of claim 1 wherein said polyvalent metallic element is selected from the group consisting of La and Ce.

19. The composition of claim 12 wherein said polyvalent metallic element is selected from the group consisting of La and Ce.

* * * * *